(12) United States Patent
Otani

(10) Patent No.: US 10,830,412 B2
(45) Date of Patent: Nov. 10, 2020

(54) LIGHT EMITTING DEVICE AND IMAGE DISPLAY SYSTEM

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/550,372

(22) Filed: Aug. 26, 2019

(65) Prior Publication Data
US 2020/0063943 A1 Feb. 27, 2020

(30) Foreign Application Priority Data
Aug. 27, 2018 (JP) .................................. 2018-158073

(51) Int. Cl.
| | |
|---|---|
| *F21V 5/04* | (2006.01) |
| *F21V 5/00* | (2018.01) |
| *G06T 7/70* | (2017.01) |
| *H04N 9/31* | (2006.01) |
| *G06F 3/042* | (2006.01) |

(52) U.S. Cl.
CPC ................ *F21V 5/04* (2013.01); *F21V 5/008* (2013.01); *G06F 3/0425* (2013.01); *G06T 7/70* (2017.01); *H04N 9/3102* (2013.01)

(58) Field of Classification Search
CPC .. F21V 5/04; F21V 5/008; G06T 7/70; H04N 9/3102; H04N 9/3179; H04N 9/3194; G06F 3/0425; G06F 3/0421
See application file for complete search history.

(56) References Cited

U.S. PATENT DOCUMENTS

| | | | |
|---|---|---|---|
| 9,992,396 B1* | 6/2018 | Scepanovic | H04N 5/232933 |
| 2013/0002612 A1* | 1/2013 | Liu | G02B 19/0052 |
| | | | 345/175 |
| 2015/0116216 A1 | 4/2015 | Sakai et al. | |
| 2017/0210282 A1* | 7/2017 | Rodriguez Barros | B60Q 1/484 |
| 2019/0384151 A1* | 12/2019 | Miyazaki | H04N 9/3152 |
| 2020/0120247 A1* | 4/2020 | Iguchi | G03B 11/00 |

FOREIGN PATENT DOCUMENTS

JP 2015-111385 A 6/2015

* cited by examiner

*Primary Examiner* — Ibrahim A Khan
(74) *Attorney, Agent, or Firm* — Dority & Manning, P.A.

(57) ABSTRACT

A first light emitter of a light emitting device includes a first lens for making first light wide-angle from a first diffusion center as a starting point, and a second light emitter includes a second lens for making second light wide-angle from a second diffusion center as a starting point. A cover lens disposed downstream of the first lens and the second lens includes a first curved surface and a second curved surface. A first curvature center as a curvature center of the first curved surface overlaps the first diffusion center of the first lens when viewed from a front-back direction, and a second curvature center as a curvature center of the second curved surface overlaps the second diffusion center of the second lens when viewed from the front-back direction.

12 Claims, 12 Drawing Sheets

LIGHT EMITTING DEVICE AND IMAGE DISPLAY SYSTEM

The present application is based on, and claims priority from JP Application Serial Number 2018-158073, filed Aug. 27, 2018, the disclosure of which is hereby incorporated by reference herein in its entirety.

BACKGROUND

1. Technical Field

The present disclosure relates to a light emitting device and an image display system equipped with the light emitting system.

2. Related Art

In JP-A-2015-111385 (Document 1), there is disclosed an image display system which detects the position of a pointing body such as a pen operated on a display surface such as a screen on which an image is displayed or a finger, and performs display or an operation corresponding to a trajectory of the pointing body. The image display system in Document 1 is provided with a projector and a light emitting device for emitting light along a projection surface (a display surface) on which the projector performs the projection, and creates a light curtain which covers the projection surface with the light emitted from the light emitting device. The projector detects the position of the pointing body based on reflection of the light by the pointing body operated on the projection surface, and then performs the projection based on the detection result.

The light emitting device in Document 1 is provided with a light emitter and a housing. The light emitter is provided with a light source, a collimator as a lens for substantially collimating the light emitted from the light source, and a directional lens for making the light in a direction, which is called a first direction, along the projection surface wide-angle out of the light substantially collimated by the collimator. In Document 1, a Powell lens is used as the directional lens. The Powell lens has a convex shape on the light incidence side and a flat shape on the light exit side when viewed from a second direction perpendicular to the first direction, and has a rectangular shape when viewed from the first direction.

The light emitting device is provided with a cover lens for covering the light emitter from the exit side. When installing the light emitting device, a device main body provided with the light emitter and a frame for supporting the cover lens are tilted relatively from each other in some cases, and in such a case, there occurs the state in which the cover lens is tilted with respect to the light emitter. When the cover lens has a curved surface shape, when the cover lens is tilted with respect to the light emitter, there arises a problem that the light made wide-angle and then emitted from the light emitter is refracted by the cover lens, and thus, the light curtain becomes distorted.

When providing the cover lens with a flat plate shape instead of the curved surface shape, the distortion of the light curtain due to the relative tilt of the cover lens with respect to the light emitter does not occur. However, when providing the flat plate shape to the cover lens, an incident angle becomes large when the light made wide-angle in the first direction enters the cover lens. As a result, there is a problem that a light intensity loss due to the interfacial reflection on the cover lens becomes large.

SUMMARY

The present disclosure has an advantage that the distortion of the light curtain due to the tilt of the cover lens with respect to the light emitter can be suppressed, and at the same time, the light intensity loss due to the interfacial reflection on the cover lens is suppressed.

A light emitting device according to an aspect of the present disclosure includes a first light source, a first collimator configured to substantially collimate light emitted from the first light source with respect to a first optical axis as an optical axis of the first light source, a second light source, a second collimator configured to substantially collimate light emitted from the second light source with respect to a second optical axis as an optical axis of the second light source, a lens configured to make first light emitted from the first collimator and second light emitted form the second collimator wide-angle with respect to a first direction different from both of the first optical axis and the second optical axis, and a cover lens disposed downstream of the lens, and having a curved surface shape including a first curved surface and a second curved surface, wherein the lens makes the first light wide-angle in the first direction from a first diffusion center as a starting point, and makes the second light wide-angle in the first direction from a second diffusion center as a starting point, and in the cover lens, a first curvature center as a curvature center of the first curved surface and the first diffusion center overlap each other, and a second curvature center as a curvature center of the second curved surface and the second diffusion center overlap each other when viewed from a direction perpendicular to the first optical axis and the second optical axis.

In this aspect of the present disclosure, the cover lens may rotate around a rotational axis line substantially parallel to the first direction.

In this aspect of the present disclosure, the lens may be a Powell lens.

In this aspect of the present disclosure, the lens includes a plurality of small lenses, and the small lenses may each be a Powell lens.

An image display system according to another aspect of the present disclosure includes anyone of the light emitting devices described above, a imager configured to detect a reflection position of light emitted from the light emitting device, and a projection device configured to project an image corresponding to a detection result detected by the imager.

DESCRIPTION OF AN EXEMPLARY EMBODIMENT

Figure 1:
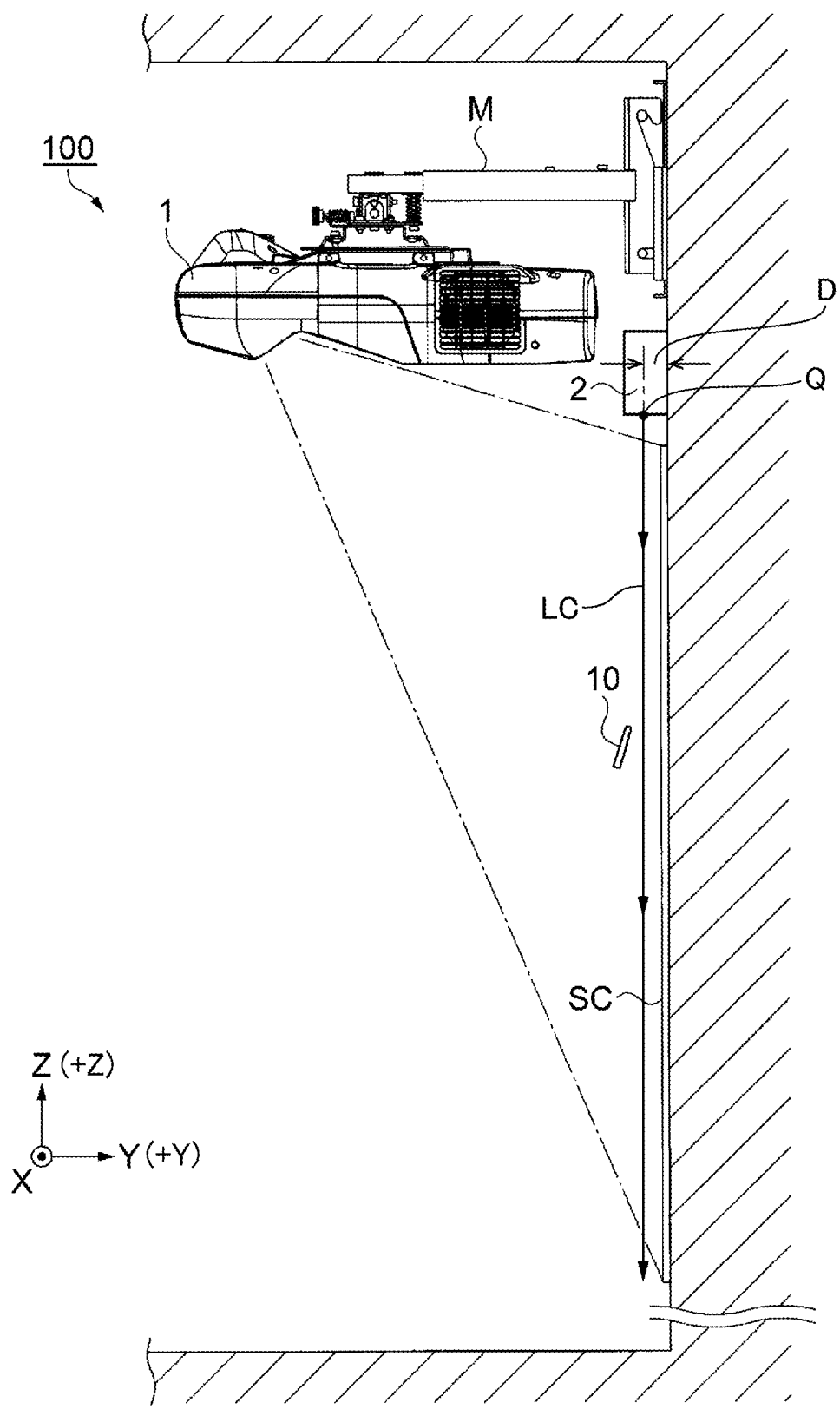
FIG. 1 is a schematic diagram showing a schematic configuration of an image display system according to an embodiment.

An embodiment of the present disclosure will hereinafter be described with reference to the accompanying drawings. It should be noted that in the drawings described hereinafter, the dimensions and the ratios of the constituents are arbitrarily made different from actual ones in order to show the constituents with sizes with which the constituents can be recognized in the drawings.

Configuration of Image Display System

FIG. 1 is a schematic diagram showing a schematic configuration of an image display system 100 according to the present embodiment. As shown in FIG. 1, the image display system 100 is provided with a projector 1 and a light emitting device 2. As shown in FIG. 1, the projector 1 is supported by a support device M installed on a wall surface above a projection surface SC such as a screen or a whiteboard, and projects an image on the projection surface SC from a side facing downward. Although described later in detail, as shown in FIG. 1, the light emitting device 2 is installed above the projection surface SC, and emits the light along the projection surface SC to create a light curtain LC.

It should be noted that in the present specification, the normal direction to the projection surface SC is defined as a front-back direction Y, and a direction toward the projection surface SC is defined as a front direction (+Y direction) as shown in FIG. 1 for the sake of convenience of explanation. Further, a vertical direction, which corresponds to a gravitational direction in this specification, is defined as a Z direction, and a gravity-defying direction is defined as an upper side (+Z direction). Further, a horizontal direction perpendicular to the front-back direction Y and the vertical direction Z is defined as a right-left direction X, and the right side when facing to the projection surface SC is defined as a +X direction. The projection surface SC is a surface substantially parallel to an X-Z plane.

Figure 2:
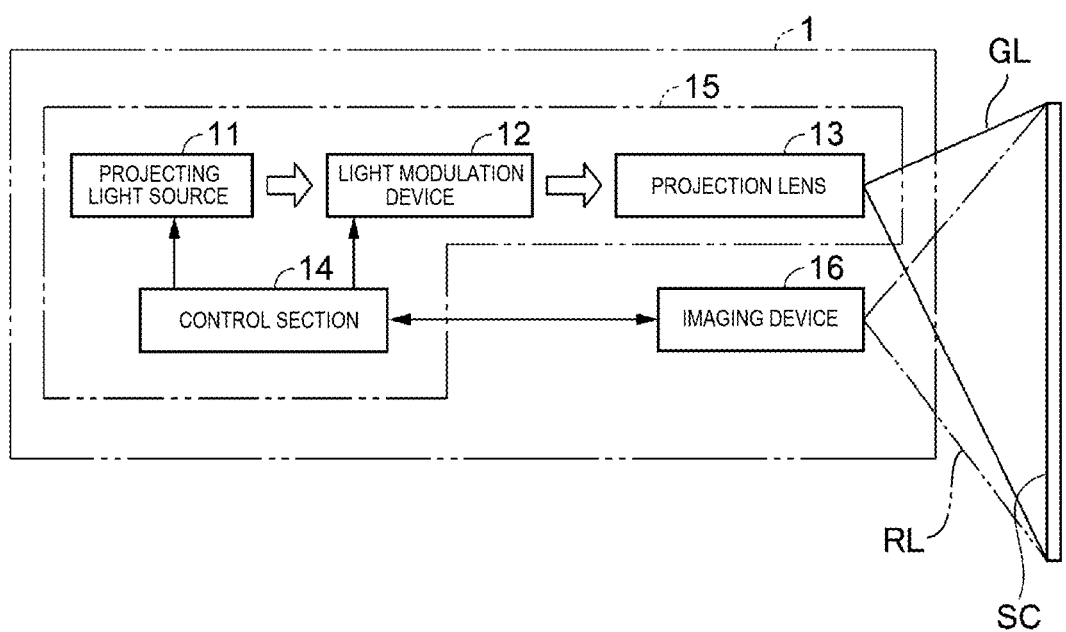
FIG. 2 is a block diagram showing a schematic configuration of a projector.

FIG. 2 is a block diagram showing a schematic configuration of the projector 1. As shown in FIG. 2, the projector 1 is provided with a projection device 15 and an imager 16. The projection device 15 is provided with a projecting light source 11, a light modulator 12, a projection lens 13 and a controller 14. The projection device 15 projects an image corresponding to image information input, or an image corresponding to a detection result detected by the imager 16 from the projection lens 13 as image light GL.

The projection device 15 modulates the light emitted from the projecting light source 11 using the light modulator 12 in accordance with the image information, and then projects the light thus modulated from the projection lens 13 on the projection surface SC. It should be noted that as the projecting light source 11, there can be used those of a discharge type, and a solid-state light source such as a light emitting diode or a laser. Further, as the light modulator 12, there can be used a device using a liquid crystal panel, a micromirror type device such as a device using a DMD and so on.

The controller 14 is a device provided with a CPU, a ROM, a RAM and so on to function as a computer, and performs, for example, control related to projection of the image based on the information output from the imager 16 in addition to control of an operation of the projector 1.

The imager 16, which is provided with imaging elements (not shown) such as CCD or CMOS, shoots the projection surface SC, and then outputs information obtained by shooting to the controller 14. Further, the imager 16 detects reflected light RL, which is a component of the light emitted from the light emitting device 2 and then reflected by the pointing body (e.g., a pen 10 or a finger of the user), to thereby detect a position (a reflection position) of the pointing body, and then outputs the information thus detected to the controller 14.

The projector 1 analyzes the position of the pointing body on the projection surface SC based on the information output from the imager 16, and then performs, for example, projection of a superimposed image obtained by superimposing a line representing the trajectory of the pointing body on the image information, and a change in the image to be projected based on the analysis result. Due to the above, it is possible to perform interactive image display which is the image display corresponding to an action of the user on the projection surface SC.

Configuration of Light Emitting Device

Figure 3:
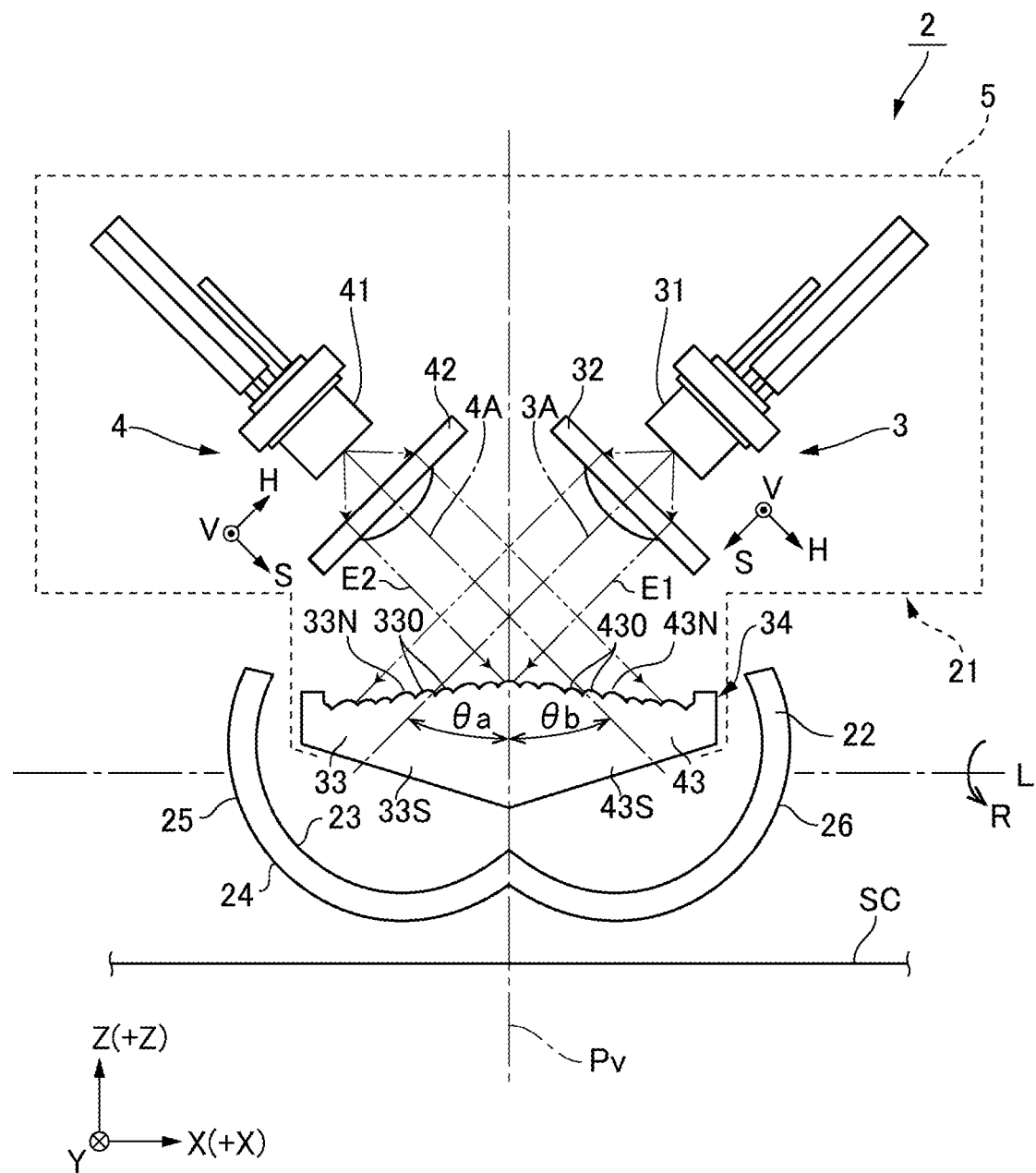
FIG. 3 is a schematic diagram showing a schematic configuration of a light emitting device according to the embodiment.

FIG. 3 is a schematic diagram showing a schematic configuration of the light emitting device 2. The light emitting device 2 is disposed on the +Z direction side of an upper hem of the projection surface SC, and at substantially the center of the projection surface SC in the right-left direction X. The light emitting device 2 emits the light along the projection surface SC. The light emitting device 2 is provided with a device main body 21 and a cover lens 22. The device main body 21 is provided with a first light emitter 3, a second light emitter 4 and a housing 5 for housing these sections inside.

As shown in FIG. 1, the light emitting device 2 is installed so as to protrude backward from a wall surface above the projection surface SC. Therefore, the first light emitter 3 and the second light emitter 4 each emit the light downward (toward the −Z direction) from an emission position Q posterior to (on the −Y direction side of) the projection surface SC. Specifically, the emission position Q of the light in the light emitting device 2 is located posterior to the projection surface SC as much as a distance D. The distance D is, for example, about 10 mm.

Figure 4:
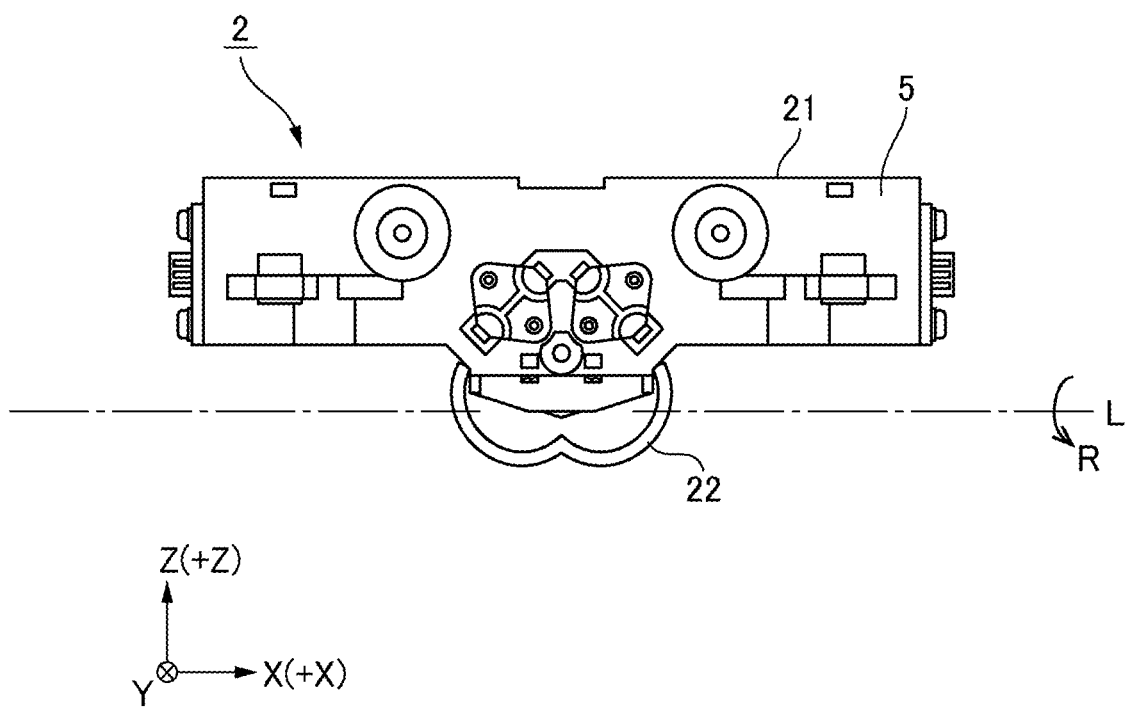
FIG. 4 is a plan view of a device main body and a cover lens.

FIG. 4 is a plan view of the device main body 21 and the cover lens 22. As described later, in the light emitting device 2, the cover lens 22 is supported so as to be able to rotate around a rotational axis L with respect to the device main body 21. The light emitting device 2 is disposed so that the rotational axis L becomes substantially parallel to the right-left direction X. It should be noted that it is also possible to adopt a configuration of supporting not only the cover lens 22 but also the device main body so as to be able to rotate around another rotational axis substantially parallel to the right-left direction X. As shown in FIG. 3, the cover lens 22 is provided with a first curved surface 25 and a second curved surface 26 each convex downward (toward the −Z direction). The first curved surface 25 and the second curved surface 26 each have a circular arc shape when viewed from the front-back direction Y, and are arranged symmetrically to each other about a virtual center plane Pv as a plane which is along the Y-Z plane and perpendicular to the projection surface SC, and extends in the vertical direction Z between the first light emitter 3 and the second light emitter 4. Further, the cover lens 22 extends in the front-back direction Y, and has a rectangular shape when viewed from the vertical direction Z.

As shown in FIG. 3, the first light emitter 3 and the second light emitter 4 are arranged in the right-left direction X, and emit the light centered on respective directions different from each other. In the present embodiment, the first light emitter 3 and the second light emitter 4 are configured symmetrically to each other with reference to the virtual center plane Pv. The first light emitter 3 is provided with a first light source 31, a first collimator 32 and a first lens 33. The first collimator 32 and the first lens 33 are disposed on a first optical axis 3A as an optical axis of the first light source 31, and emit the light obliquely downward left.

Similarly to the first light emitter 3, the second light emitter 4 is provided with a second light source 41, a second collimator 42 and a second lens 43, and has a second light path extending from the second light source 41 to the second lens 43. The second collimator 42 and the second lens 43 are disposed on a second optical axis 4A as an optical axis of the second light source 41, and emit the light around a direction obliquely downward right.

In the light emitting device 2, the first optical axis 3A and the second optical axis 4A cross each other in an anterior stage of the light path of each of the first lens 33 and the second lens 43. Specifically, the first optical axis 3A and the second optical axis 4A cross each other between the first collimator 32 and the first lens 33 and between the second collimator 42 and the second lens 43. In other words, in the light emitting device 2, there is adopted a configuration in which the light emitted from the first light emitter 3 and the light emitted form the second light emitter 4 partially overlap each other.

The first light source 31 and the second light source 41 are each a laser source for emitting the light having the peak light intensity at a wavelength of about 940 nm, and each have, for example, an active layer as a light emitter and cladding layers respectively stacked on both sides of the active layer. As the first light source 31 and the second light source 41, there is used a laser source of a type such as a multimode oscillation type in which the light distribution characteristic is different between a width direction H and a stacking direction V, wherein the width direction H is parallel to the active layer, the stacking direction V is perpendicular to the width direction H, and the active layer and the cladding layers are stacked in the stacking direction V. The light from the first light source 31 and the light from the second light source 41 are each emitted in an S direction perpendicular to the width direction H and the stacking direction V. In other words, the S direction is the direction along each of the first optical axis 3A and the second optical axis 4A. In the present embodiment, the width direction H and the S direction are set to the directions along the projection surface SC shown in FIG. 1. In other words, the width direction H and the S direction are made substantially parallel to the X-Z plane.

The first collimator 32 substantially collimates the light emitted from the first light source 31. Similarly, the second collimator 42 substantially collimates the light emitted from the second light source 41. For example, the first collimator 32 makes component light, which is emitted from a point on the first optical axis 3A and spreads at an angle with the first optical axis 3A, proceed so as to substantially be parallel to the first optical axis 3A. Similarly, the second collimator 42 makes component light, which is emitted from a point on the second optical axis 4A and spreads at an angle with the second optical axis 4A, proceed so as to substantially be parallel to the second optical axis 4A.

The first lens 33 and the second lens 43 are provided to a single lens body 34. The lens body 34 is formed of a material such as synthetic resin high in refractive index, and has a rectangular shape when viewed from the vertical direction Z. As shown in FIG. 3, the lens body 34 has a symmetrical shape with reference to the virtual center plane Pv, wherein the first lens 33 is located on the left side (the −X direction side) of the lens body 34 and the second lens 43 is located on the right side (the +X direction side) of the lens body 34. When a plane (a plane along the Y-Z plane) perpendicular to the projection surface SC, and extending in the vertical direction Z between the first light emitter 3 and the second light emitter 4 is defined as the virtual center plane Pv, the first light emitter 3 and the second light emitter 4 are arranged to have symmetry about the virtual center plane Pv.

The first lens 33 is tilted toward a direction in which the distance from the first collimator 32 increases as the distance from the virtual center plane Pv increases. The first lens 33 is provided with a first incident plane 33N having a plurality of small lenses 330 arranged on a side (a light incident side) opposed to the first collimator 32, and a first plane 33S disposed on a light exit side. Each of the small lenses 330 is a Powell lens, and has a convex shape on the first collimator 32 side. On the first incident plane 33N, each of the small lenses 330 extends in the stacking direction V, and the plurality of small lenses 330 is arranged in a direction perpendicular to the stacking direction V. The plurality of small lenses 330 is arranged in the width direction H on the first incident plane 33N, and at the same time, arranged in a direction in which the distance from the first collimator 32 increases as the distance from the virtual center plane Pv increases.

The first lens 33 makes first light E1 emitted from the first collimator 32 wide-angle in the width direction H while keeping the direction of the first light E1 having been collimated by the first collimator 32 in the stacking direction V, and then emits the first light E1 around the first optical axis 3A. In other words, the first lens 33 makes the first light E1 entering the first lens 33 wide-angle only in the direction corresponding to the width direction H out of the directions perpendicular to the first optical axis 3A. On this occasion, the plurality of small lenses 330 provided to the first lens 33 is formed so that the light made wide-angle by one of the small lenses 330 and the light made wide-angle by adjacent one of the small lenses 330 in the width direction H are superimposed with each other.

The second lens 43 is configured so as to be symmetrical to the first lens 33 about the virtual center plane Pv. Specifically, the second lens 43 is provided with a second incident plane 43N having a plurality of small lenses 430 arranged on a light incident side opposed to the second collimator 42, and a second plane 43S disposed on a light exit side. The second lens 43 makes second light E2 emitted from the second collimator 42 wide-angle only in a direction corresponding to the width direction H out of the directions perpendicular to the second optical axis 4A. On this occasion, the plurality of small lenses 430 provided to the second lens 43 is formed so that the light made wide-angle by one of the small lenses 430 and the light made wide-angle by adjacent one of the small lenses 430 in the width direction H are superimposed with each other.

As shown in FIG. 3, the light emitting device 2 is arranged so that the width direction H of the light emitted from each of the first lens 33 and the second lens 43 becomes a direction along the projection surface SC. In other words, the first light emitter 3 and the second light emitter 4 are arranged so that the light made wide-angle in each of the first lens 33 and the second lens 43 is made wide-angle in a direction parallel to the right-left direction X of the projection surface SC. In other words, the light emitting device 2 makes the first light E1 and the second light E2 emitted respectively from the first collimator 32 and the second collimator 42 wide-angle in the right-left direction X which is a first direction different from both of the first optical axis 3A and the second optical axis 4A.

Further, as shown in FIG. 3, in the light emitting device 2, the first light emitter 3 and the second light emitter 4 are tilted in respective directions different from each other with respect to the virtual center plane Pv, and a part of the light emitted by the first light emitter 3 and a part of the light emitted by the second light emitter 4 overlap each other at the position of the virtual center plane Pv. Specifically, when viewed from the −Y direction toward +Y direction, the first light axis 3A is tilted in a clockwise direction with respect to the virtual center plane Pv, and the second optical axis 4A is tilted in a counterclockwise direction with respect to the virtual center plane Pv. A tilt angle θa of the first optical axis 3A with respect to the virtual center plane Pv and a tilt angle θb of the second optical axis 4A are the same (θa=θb), and thus, the first light emitter 3 and the second light emitter 4 are arranged so as to be substantially symmetrical to each other about the virtual center plane Pv. Thus, the light emitting device 2 emits the light along the projection surface SC to create the light curtain LC covering the entire area of the projection surface SC.

The tilt angles θa, θb are set to angles corresponding to the aspect ratio of the projection surface SC. For example, the light emitting device 2 is configured so as to efficiently emit the light along the projection surface SC which is a landscape surface with the aspect ratio of 16:10. Specifically, in order to provide the highest intensity to the light proceeding toward right and left end parts of a lower hem of the projection surface SC which are the farthest position from the light emitting device 2, the tilt angles θa, θb are set so that the first optical axis 3A extends toward the left end part of the lower hem of the projection surface SC, and the second optical axis 4A extends toward the right end part of the lower hem of the projection surface SC. It should be noted that the aspect ratio of the projection surface is not limited to 16:10, but can also be other values. For example, 2:1 can also be adopted. When the aspect ratio is 2:1, the tilt angles θa, θb are set to 45°.

Since in the light emitting device 2, the light path of the first light emitter 3 and the light path of the second light emitter 4 cross each other, the light emitted by the first light emitter 3 and the light emitted by the second light emitter 4 overlap at a position near to the light emitting device 2 as shown in FIG. 3. In other words, it becomes possible for the light emitting device 2 to emit the light sufficient in light intensity to a nearby area. Thus, even when the light emitting device 2 is disposed near to the projection surface SC, the light emitting device 2 emits the light sufficient to detect the pointing body also in an area adjacent to the light emitting device 2 in the projection surface SC.

Shape of Light Curtain

Figure 5:
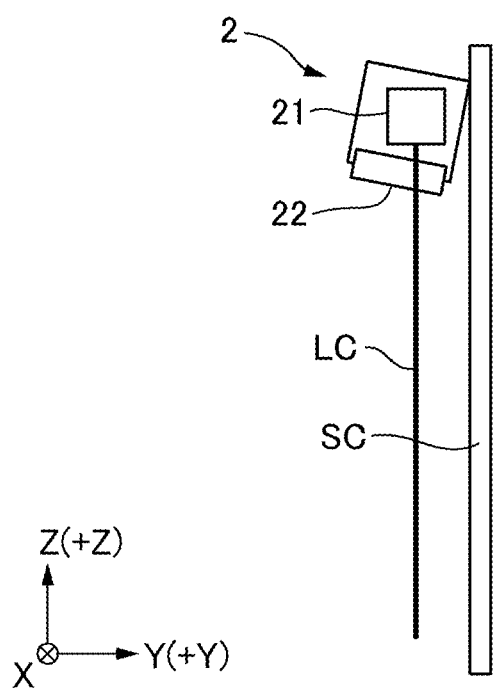
FIG. 5 is a schematic diagram showing a state in which the cover lens is installed so as to tilt with respect to the device main body.

FIG. 5 is a schematic diagram showing a state in which the cover lens 22 is installed so as to tilt with respect to the device main body 21. FIG. 5 shows the state in which the frame supporting the cover lens 22 is installed so as to tilt with respect to the projection surface SC although the emission direction of the light from the device main body 21 is a direction along the projection surface SC. In the installation state shown in FIG. 5, the cover lens 22 is tilted with respect to the first light emitter 3 and the second light emitter 4. As described above, the cover lens 22 is supported so as to be able to rotate around the rotational axis L substantially parallel to the right-left direction X to make it possible to adjust the tilt angle of the cover lens 22 with respect to the first light emitter 3 and the second light emitter 4.

Figure 6:
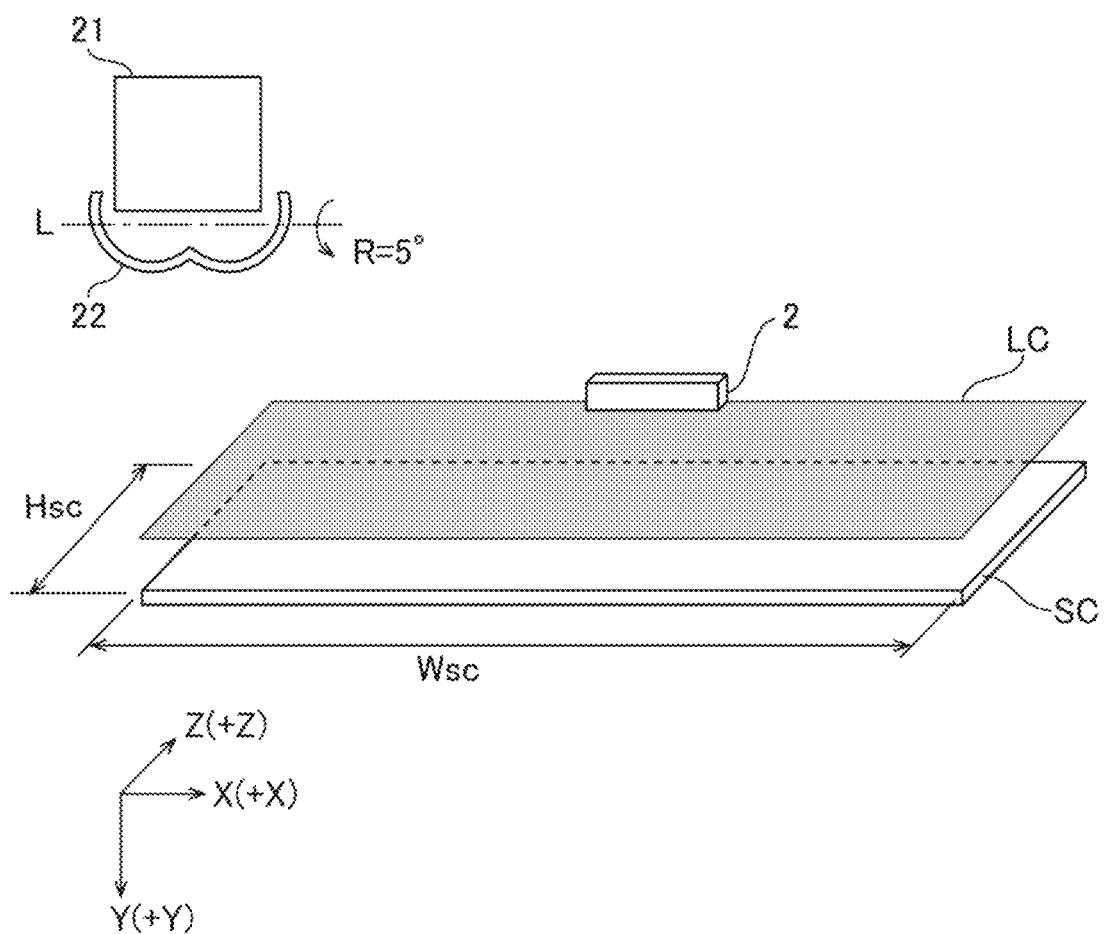
FIG. 6 is a schematic diagram showing a shape of a light curtain in the embodiment.

FIG. 6 is a schematic diagram showing a shape of the light curtain LC in the present embodiment. FIG. 6 shows the shape of the light curtain LC when the tilt angle R of the cover lens 22 with respect to the first light emitter 3 and the second light emitter 4 is 5°. The light emitting device 2 according to the present embodiment is configured so that the light curtain LC can keep a flat shape as shown in FIG. 6 even when the cover lens 22 is installed so as to tilt with respect to the first light emitter 3 and the second light emitter 4 as shown in FIG. 5. As described above, since the emission position Q of the light from each of the first light emitter 3 and the second light emitter 4 is located at the distance D from the projection surface SC, the light curtain LC is formed at a position away from the projection surface SC as much as the distance D.

Figure 7:
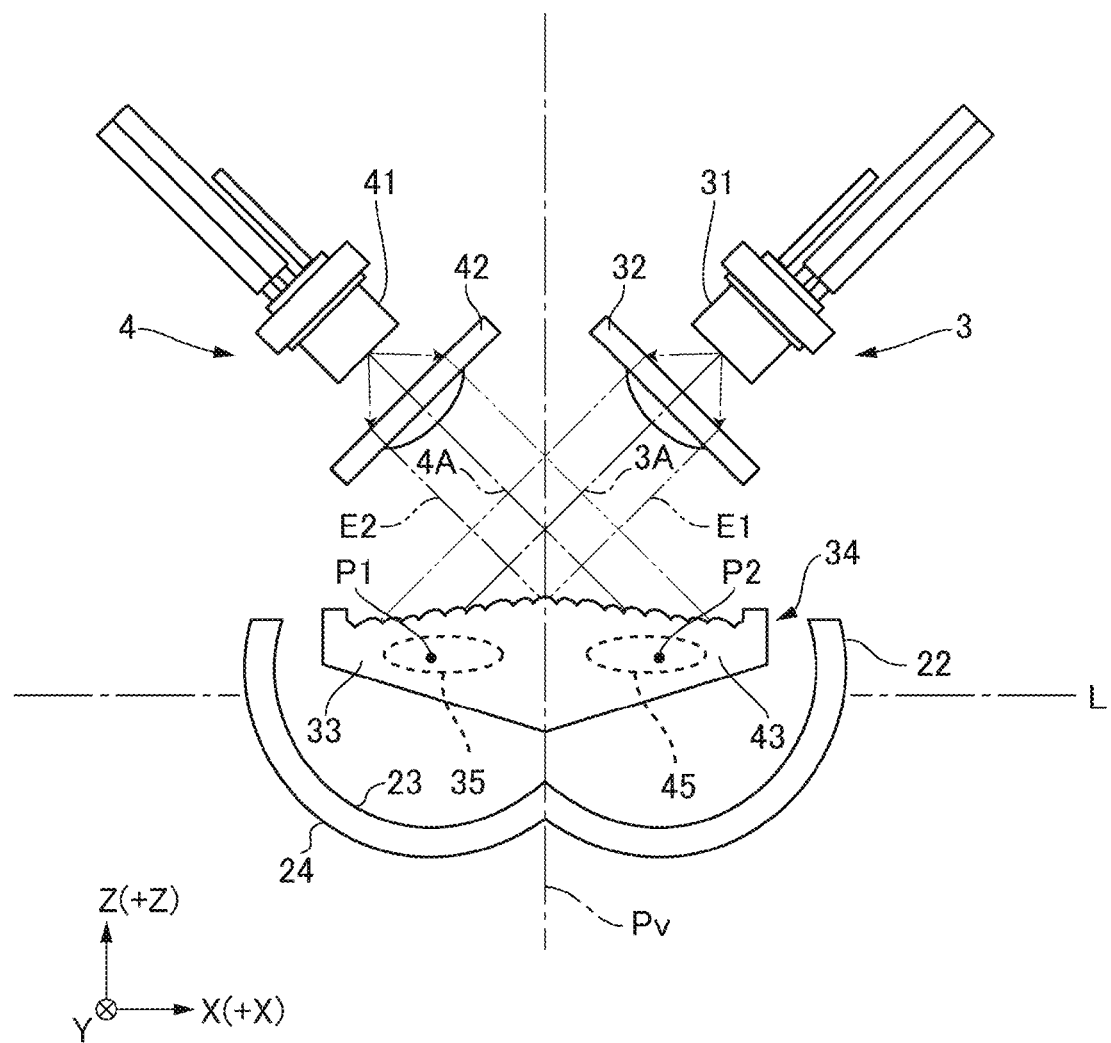
FIG. 7 is a schematic diagram showing curvature centers of the cover lens and diffusion centers of first light and second light.

FIG. 7 is a schematic diagram showing curvature centers of the cover lens 22 and diffusion centers of the first light and the second light. Here, the principle of the phenomenon that the shape of the light curtain LC does not change even when the cover lens 22 is installed so as to tilt with respect to the first light emitter 3 and the second light emitter 4 with reference to FIG. 7. As described above, the cover lens 22 is provided with the first curved surface 25 and the second curved surface 26 arranged symmetrically to each other about the virtual center plane Pv. The light emitted from the first light emitter 3 is transmitted through the first curved surface 25, and the light emitted from the second light emitter 4 is transmitted through the second curved surface 26.

In the first light emitter 3, the first light E1 having entered the first incident plane 33N of the first lens 33 from the first collimator 32 is converged most in the right-left direction X in a first diffusion center 35 in the first lens 33, and is made wide-angle in the right-left direction X from the first diffusion center 35 as a starting point. Similarly, in the second light emitter 4, the second light E2 having entered the second incident plane 43N of the second lens 43 from the second collimator 42 is converged most in the right-left direction X in a second diffusion center 45 in the second lens 43, and is made wide-angle in the right-left direction X from the second diffusion center 45 as a starting point. As shown in FIG. 7, in the lens body 34 in the present embodiment, the first diffusion center 35 and the second diffusion center 45 are each an area having a predetermined size but not a point. The first diffusion center 35 and the second diffusion center 45 are located symmetrically to each other about the virtual center plane Pv.

The cover lens 22 has a two-humped lens shape having the first curved surface 25 and the second curved surface 26, and the first curved surface 25 and the second curved surface 26 are arranged symmetrically to each other about the virtual center plane Pv. A first curvature center P1 as the curvature center of the first curved surface 25 is located at a position overlapping the first diffusion center 35 of the first lens 33 when viewed from the front-back direction Y. Further, a second curvature center P2 as the curvature center of the second curved surface 26 is located at a position overlapping the second diffusion center 45 of the second lens 43 when viewed from the front-back direction Y.

In the present embodiment, since the first curvature center P1 overlaps the first diffusion center 35 and the second curvature center P2 overlaps the second diffusion center 45 as described above, even when tilting the cover lens 22 around the rotational axis L, there is kept the state in which the incident angle of the light with respect to the inner surface 23 of the first curved surface 25 and the incident angle of the light with respect to the outer surface 24 of the first curved surface 25 coincide with each other. Therefore, even when tilting the cover lens 22, the direction of the light transmitted through the first curved surface 25 does not change due to refraction. Similarly, the direction of the light transmitted through the second curved surface 26 does not change due to refraction. Therefore, even when the cover lens 22 is installed so as to tilt with respect to the first light emitter 3 and the second light emitter 4, there is no chance for the shape of the light curtain LC to be distorted, and thus, the light curtain LC having the flat shape is formed as shown in FIG. 6.

Shape of Light Curtain with Cover Lens in Comparative Example

Figure 8:
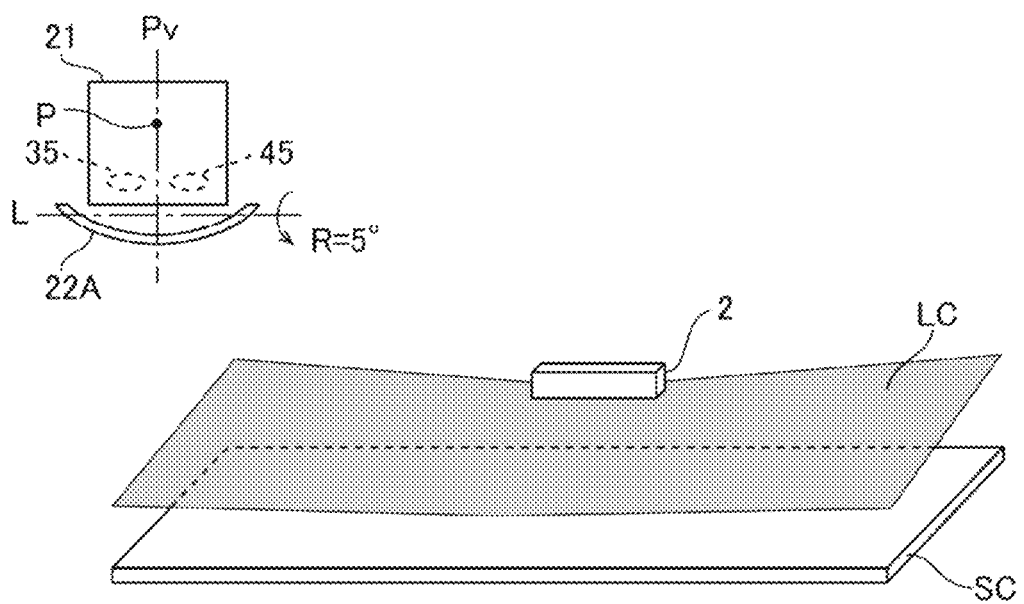
FIG. 8 is a schematic diagram showing a shape of a light curtain in Comparative Example 1.
Figure 9:
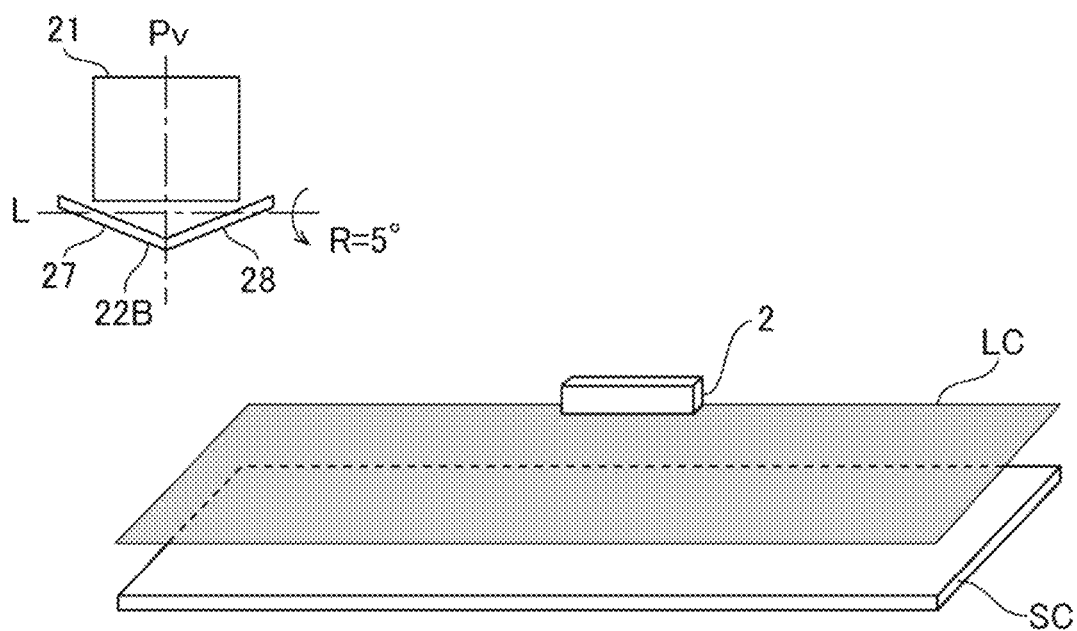
FIG. 9 is a schematic diagram showing a shape of a light curtain in Comparative Example 2.

FIG. 8 is a schematic diagram showing a shape of a light curtain LC in Comparative Example 1. Further, FIG. 9 is a schematic diagram showing a shape of a light curtain LC in Comparative Example 2. A light emitting device according to each of Comparative Examples 1, 2 has the same configuration except the shape of the cover lens. FIG. 8 and FIG. 9 each show the shape of the light curtain LC when the tilt angle of the cover lens with respect to the first light emitter 3 and the second light emitter 4 is 5° similarly to the present embodiment.

As schematically shown in FIG. 8, in Comparative Example 1, the cover lens 22A has a circular arc shape provided with a single curved surface, and the curvature center P is located on the virtual center plane Pv. The cover lens 22A has the curvature center P different in position from the first diffusion center 35 and the second diffusion center 45 when viewed from the front-back direction Y. In such a configuration, when the cover lens 22A tilts around the rotational axis L, the incident angle of the light with respect to the inner surface of the cover lens 22A and the incident angle of the light with respect to the outer surface of the cover lens 22A do not coincide with each other. Therefore, since the direction of the light transmitted through the cover lens 22A changes due to refraction, the shape of the light curtain LC is distorted as shown in FIG. 8.

In contrast, as shown in FIG. 9, the cover lens 22B in the Comparative Example 2 has a shape provided with a first flat 27 and a second flat 28 symmetric to each other about the virtual center plane Pv. In such a configuration, when the cover lens 22B tilts around the rotational axis L, there is kept the state in which the incident angle of the light with respect to the inner surface of the cover lens 22B and the incident angle of the light with respect to the outer surface of the cover lens 22B coincide with each other. Therefore, in Comparative Example 2, even when the cover lens 22B is installed so as to tilt with respect to the first light emitter 3 and the second light emitter 4, there is no chance for the shape of the light curtain LC to be distorted similarly to the present embodiment. However, as described hereinafter, the cover lens 22B in the Comparative Example 2 is larger in the light loss due to the interfacial reflection than the cover lens 22 in the present embodiment.

Incident Angle of Light to Cover Lens

Figure 10:
FIG. 10 is a graph showing an incident angle distribution of light with respect to the cover lens in the embodiment.
Figure 11:
FIG. 11 is a graph showing an incident angle distribution of light with respect to the cover lens in Comparative Example 1.
Figure 12:
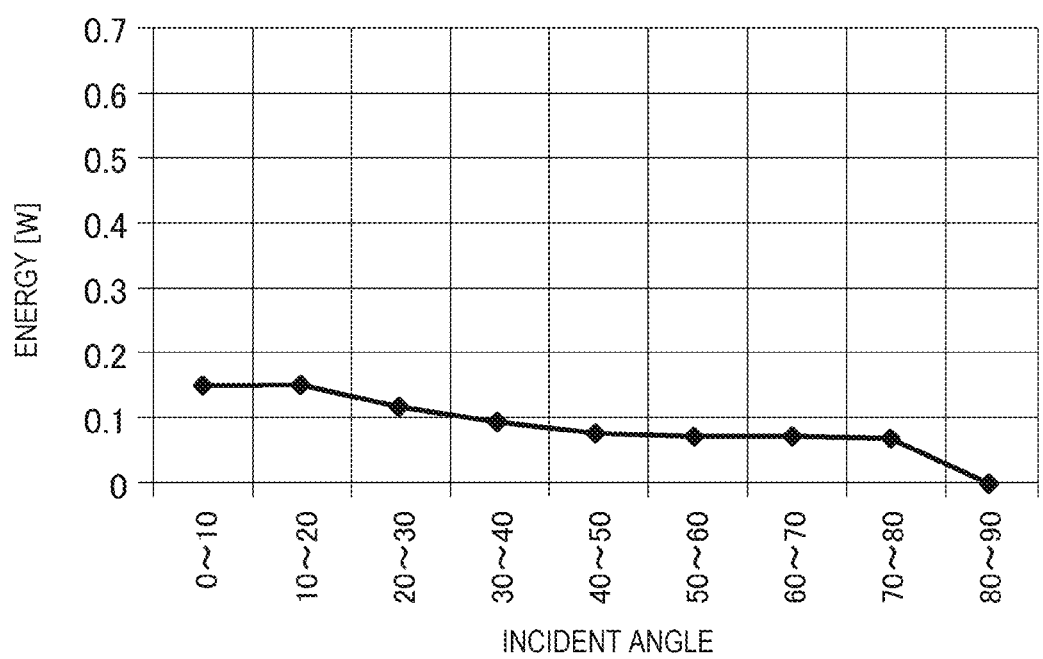
FIG. 12 is a graph showing an incident angle distribution of light with respect to the cover lens in Comparative Example 2.

FIG. 10 is a graph showing an incident angle distribution of light with respect to the cover lens 22 in the present embodiment. Further, FIG. 11 is a graph showing the incident angle distribution of light with respect to the cover lens 22A in Comparative Example 1, and FIG. 12 is a graph showing the incident angle distribution of light with respect to the cover lens 22B in Comparative Example 2. In each of FIG. 10 through FIG. 12, the horizontal axis represents the incident angle, and the vertical axis represents the incident light energy. As a result of the simulation of the incident angle distribution of the light with respect to the cover lenses 22, 22A and 22B performed under the condition of assuming the distance D in the front-back direction Y between the emission position Q of the light in the light emitting device 2 and the projection surface SC as 10 mm, the width Wsc (see FIG. 6) of the projection surface SC as 2,154 mm, and the height Hsc (see FIG. 6) of the projection surface SC as 1,346 mm, there has been obtained the data shown in FIG. 10 through FIG. 12.

As shown in FIG. 10, in the cover lens 22 in the present embodiment, since the two curved surfaces are provided corresponding respectively to the first diffusion center 35 and the second diffusion center 45, the maximum value of the incident angle is around 40°. In contrast, as shown in FIG. 11, since the cover lens 22A in the Comparative Example 1 has just one curved surface, a larger proportion of light has larger incident angle than that of the cover lens 22 in the present embodiment, and the maximum value of the incident angle is around 60°. Further, as shown in FIG. 12, since the cover lens 22B in the Comparative Example 2 is constituted by the first flat 27 and the second flat 28, a larger proportion of light has larger incident angle than that of Comparative Example 1 having the circular arc shape, and the maximum value of the incident angle is around 80°.

As described above, in the shape of the cover lens 22B in Comparative Example 2, since the incident angle of the light entering the cover lens 22B from the first light emitter 3 and the second light emitter 4 is large although the shape of the light curtain LC is not distorted, the light loss due to the interfacial reflection is large.

Major Functions and Advantages of Present Embodiment

As described hereinabove, the light emitting device 2 according to the present embodiment is provided with the first light emitter 3 and the second light emitter 4, and the first light emitter 3 is provided with the first light source 31, the first collimator 32 and the first lens 33, wherein the first light source 31 emits the light, the first collimator 32 substantially collimates the light emitted from the first light source 31 with respect to the first optical axis 3A, and the first lens 33 makes the first light E1 emitted from the first collimator 32 wide-angle with respect to the right-left direction X as the first direction different from the first optical axis 3A. Further, the second light emitter 4 is provided with the second light source 41, the second collimator 42 and the second lens 43, wherein the second light source 41 emits the light, the second collimator 42 substantially collimates the light emitted from the second light source 41 with respect to the second optical axis 4A, and the second lens 43 makes the second light E2 emitted from the second collimator 42 wide-angle with respect to the right-left direction X as the first direction different from the second optical axis 4A. Further, the cover lens 22 having the curved surface shape provided with the first curved surface 25 and the second curved surface 26 is disposed downstream of the first lens 33 and the second lens 43.

In the light emitting device 2 according to the present embodiment, the first curvature center P1 as the curvature center of the first curved surface 25 of the cover lens 22 and the first diffusion center 35 forming the starting point from which the first light E1 is made wide-angle in the first lens 33 overlap each other, and the second curvature center P2 as the curvature center of the second curved surface 26 and the second diffusion center 45 forming the starting point from which the second light E2 is made wide-angle in the second lens 43 overlap each other. Therefore, even when the cover lens 22 tilts with respect to the first light emitter 3 and the second light emitter 4, there is no chance for the light transmitted through the cover lens 22 to be refracted in accordance with the emission direction of the light to distort the light curtain LC. Further, since the incident angle of the light entering the cover lens 22 from the first light emitter 3 or the second light emitter 4 is small, the light loss due to the interfacial reflection can be made small. Therefore, the distortion of the light curtain LC is small, and the deterioration of the light intensity of the light curtain LC is small. Therefore, it is possible for the image display system equipped with the light emitting device 2 according to the present embodiment to improve the operability of the touch operation in the upper part of the projection surface SC.

In the present embodiment, the cover lens 22 is supported so as to be able to rotate around the rotational axis L as the rotational axis line substantially parallel to the right-left direction X. Therefore, when the cover lens 22 is tilted with respect to the first light emitter 3 and the second light emitter 4, it is possible to adjust the installation angle of the cover lens 22 to an appropriate angle.

In the present embodiment, the first lens 33 and the second lens 43 are respectively provided with the lens arrays having the small lenses 330, 430 each formed of a Powell lens arranged in an array. By arranging the Powell lenses in an array as described above, the light made wide-angle by the small lenses 330, 430 adjacent to each other is superimposed with each other. Therefore, even when the deterioration in positional accuracy between the first light source 31 and the first lens 33 and the deterioration in positional accuracy between the second light source 41 and the second lens 43 occur, it is possible to suppress the eccentricity of the intensity distribution of the light in the direction along the projection surface SC. Therefore, it becomes possible to loosen the alignment accuracy between the first light source 31 and the first lens 33 and the alignment accuracy between the second light source 41 and the second lens 43.

MODIFIED EXAMPLES (1) Although the lens arrays each having the small lenses each formed of the Powell lens arranged in an array are used as the lenses in the present embodiment, it is also possible to use a single Powell lens.

(2) Although the first optical axis 3A and the second optical axis 4A cross each other in the anterior stage of the light path of each of the first lens 33 and the second lens 43 in the present embodiment, it is also possible to configure the first light emitter 3 and the second light emitter 4 so that the first optical axis 3A and the second optical axis 4A do not cross each other.

Other Embodiments

The present disclosure is not limited to the embodiment described above, but can be implemented in a variety of aspects within the scope of the present disclosure. For example, although the image display system 100 according to the present embodiment is a system for projecting the image light GL on the projection surface SC with the projector 1, it is sufficient for the projection surface SC to be a display surface for displaying an image. For example, it is also possible to adopt a configuration of covering the display surface such as a liquid crystal display or an organic EL display with the light curtain formed by the light emitting device.

What is claimed is:

1. A light emitting device comprising:
a first light source;
a first collimator configured to substantially collimate light emitted from the first light source with respect to a first optical axis as an optical axis of the first light source;
a second light source;
a second collimator configured to substantially collimate light emitted from the second light source with respect to a second optical axis as an optical axis of the second light source;
a lens configured to make first light emitted from the first collimator and second light emitted form the second collimator wide-angle with respect to a first direction different from both of the first optical axis and the second optical axis; and
a cover lens disposed downstream of the lens, and having a curved surface shape including a first curved surface and a second curved surface, wherein
the lens makes the first light wide-angle in the first direction from a first diffusion center as a starting point, and makes the second light wide-angle in the first direction from a second diffusion center as a starting point, and
in the cover lens, a first curvature center as a curvature center of the first curved surface and the first diffusion center overlap each other, and a second curvature center as a curvature center of the second curved surface and the second diffusion center overlap each other when viewed from a direction perpendicular to the first optical axis and the second optical axis.

2. The light emitting device according to claim 1, wherein the cover lens rotates around a rotational axis line substantially parallel to the first direction.

3. The light emitting device according to claim 1, wherein the lens is a Powell lens.

4. The light emitting device according to claim 2, wherein the lens is a Powell lens.

5. The light emitting device according to claim 1, wherein the lens includes a plurality of small lenses disposed on a light incident side of the lens and arranged in the first direction, and
the small lenses are Powell lenses.

6. The light emitting device according to claim 2, wherein the lens includes a plurality of small lenses disposed on a light incident side of the lens and arranged in the first direction, and
the small lenses are Powell lenses.

7. An image display system comprising:
the light emitting device according to claim 1;
an imager configured to detect a reflection position of light emitted from the light emitting device;
a projection surface; and
a projection device configured to project an image corresponding to a detection result detected by the imager on the projection surface.

8. An image display system comprising:
the light emitting device according to claim 2;
an imager configured to detect a reflection position of light emitted from the light emitting device;
a projection surface; and
a projection device configured to project an image corresponding to a detection result detected by the imager on the projection surface.

9. An image display system comprising:
the light emitting device according to claim 3;
an imager configured to detect a reflection position of light emitted from the light emitting device;
a projection surface; and
a projection device configured to project an image corresponding to a detection result detected by the imager on the projection surface.

10. An image display system comprising:
the light emitting device according to claim 4;
an imager configured to detect a reflection position of light emitted from the light emitting device;
a projection surface; and
a projection device configured to project an image corresponding to a detection result detected by the imager on the projection surface.

11. An image display system comprising:
the light emitting device according to claim 5;
an imager configured to detect a reflection position of light emitted from the light emitting device;
a projection surface; and
a projection device configured to project an image corresponding to a detection result detected by the imager on the projection surface.

12. An image display system comprising:
the light emitting device according to claim 6;
an imager configured to detect a reflection position of light emitted from the light emitting device;
a projection surface; and
a projection device configured to project an image corresponding to a detection result detected by the imager on the projection surface.

* * * * *